Jan. 15, 1957    T. S. WALSH    2,777,732
CLEAR VISION RAIN VISORS
Filed Dec. 1, 1954
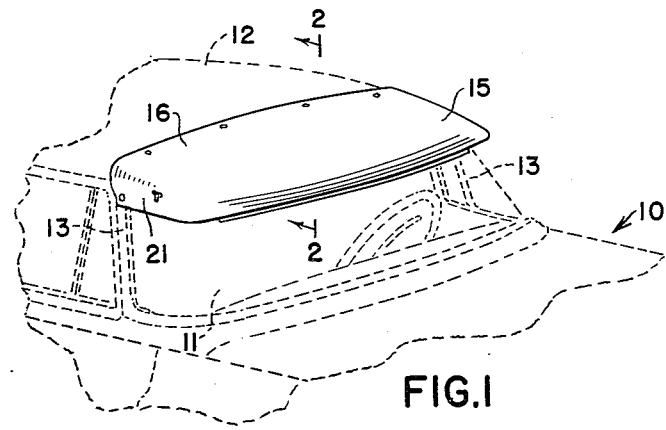
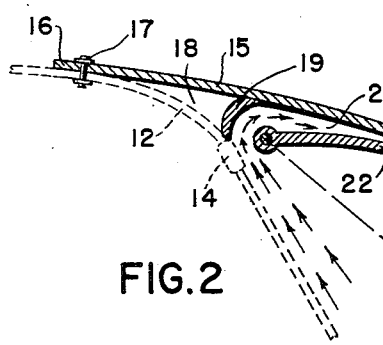
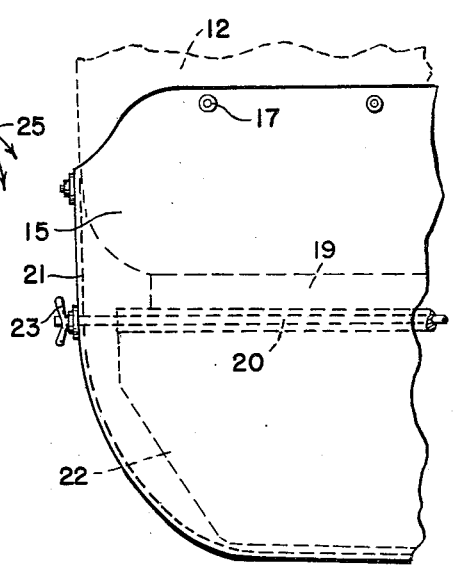
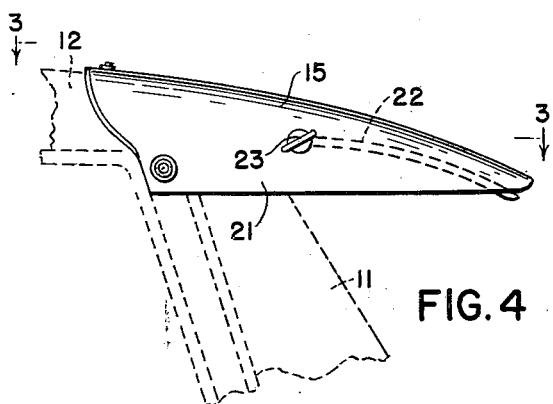
INVENTOR.
Thomas S. Walsh
BY F. Ledermann
ATTORNEY

United States Patent Office 2,777,732
Patented Jan. 15, 1957

2,777,732

CLEAR VISION RAIN VISORS

Thomas S. Walsh, Ozone Park, N. Y.

Application December 1, 1954, Serial No. 472,433

1 Claim. (Cl. 296—95)

This invention relates to windshield rain visors, and the main object is the provision of a novel and improved windshield rain visor so constructed and mounted that the wind occasioned by the forward motion of the automobile tends to keep the vision of the driver clear.

Another object of the invention is the provision of a clear vision windshield visor so constructed that the wind impinging on the windshield tends to clear the rain from the glass as well as to dry the glass.

The above broad as well as additional and more specific objects will be clarified in the description below wherein characters of reference refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing, Fig. 1 is a fragmentary perspective view of an automobile equipped with a rain visor embodying the features of the present invention.

Fig. 2 is a sectional view taken on the line 2—2 of Fig. 1.

Fig. 3 is a fragmentary plan view of Fig. 1.

Fig. 4 is a fragmentary side elevational view of Fig. 1.

Referring in detail to the drawing, the numeral 10 indicates an automobile having the sloping windshield 11 and the roof 12, the windshield enclosure or frame including the two side members 13 and the cross member 14 at the top.

The visor comprises a top portion or hood 15 having its rear edge 16 secured to the roof 12 rearward of the frame member 14 in any desired manner, as by bolts or rivets 17, or otherwise. Although the hood 15 is somewhat convex in cross-section, the curvature thereof is less than that of the forward portion of the roof 12 so that a space 18 remains between the two. A rounded baffle 19 extends transversely of the vehicle between the upper frame member 14 of the windshield and the hood 15, blocking off the space 18, with its concave side facing forward.

A transverse rod 20 extends between side ears 21 on the ends of the hood 15, spaced forward of the baffle 19 and the frame portion 14, and rigid thereon between the said ears is a curved vane 22, the vane having its convex side upward. The ends of the rod 20 are threaded and the rod is adapted to be tightened against rotation by the wing nuts 23 on the ends thereof, outside the wings 21. Thus the angular position of the vane with respect to the hood is adapted to be altered as desired.

The preferred angular position between the hood and the vane is one in which the space or passage 24 between these members tapers in a forward direction, substantially as shown in Fig. 2, and terminates in a wide narrow opening or slit 25 between the front edges of the two members. As the wind impinges on the windshield during forward movement of the vehicle, that portion thereof which is not diverted to the sides of the windshield moves upward to the baffle 19 and thence forward through the passage 24, following the direction of the arrows, Fig. 2, and emerging through the slit 25 in a forwardly and downwardly directed stream of air under pressure owing to the taper of the passage 24. If rain, snow or sleet is falling, this stream of air from the slit 25, which is directed so as to intercept the oncoming air against the windshield, tends to disperse the latter and with it the precipitation which is falling. Thus the amount and concentration of the precipitation which may reach the windshield is substantially reduced, with consequent improved vision for the driver.

The adjustability of the angular position of the vane with respect to the hood and hence also of the degree of opening, or width, of the slit 25, provided as above-described, permits of experimentation to obtain the most efficient action in thus dispersing the precipitation, under any given driving conditions.

Obviously, modifications in form or structure may be made without departing from the spirit or scope of the invention.

I claim:

In combination with a vehicle having a sloping windshield and a roof having the forward portion thereof curving downward toward and meeting the top edge of the windshield, a rain visor comprising a hood having a front edge and a rear edge, said hood having the rear edge thereof secured to said roof spaced rearwardly from said top edge of the windshield, said hood having a larger radius of curvature than said forward portion of the roof and extending tangentially forward from the roof over said forward portion of the roof and the windshield, a transverse baffle mounted between the hood and the top of the windshield and in sealing contact along its top and bottom edges between the hood and the windshield, said baffle being curved in cross-section and having the concave side thereof facing forward, a vane having a rear edge and a front edge, said vane being mounted under said hood and spaced therefrom with said rear edge thereof positioned near but spaced forward from said baffle and with said front edge thereof positioned near the front edge of the hood thereby providing for the wind moving upward along the windshield a smoothly curved passage between said baffle and the rear edge of the vane and thence forward between the hood and the vane, said vane being curved in cross-section at a radius of curvature intermediate between that of the baffle and that of the hood whence said passage between the hood and the vane tapers toward the forward edge thereof which is defined by the forward edges of the hood and the vane.

References Cited in the file of this patent

UNITED STATES PATENTS

| 1,078,765 | Baldwin | Nov. 18, 1913 |
| 1,556,902 | Beville et al. | Oct. 13, 1925 |
| 1,726,395 | Kishimoto | Aug. 27, 1929 |
| 1,766,884 | Cox | June 24, 1930 |
| 2,573,039 | Maher | Oct. 30, 1951 |

FOREIGN PATENTS

| 631,078 | France | Sept. 6, 1927 |
| 719,898 | France | Nov. 24, 1931 |